Feb. 16, 1960   G. H. PRIMEAU   2,924,988
TRANSMISSION CONTROL
Filed Sept. 23, 1957   4 Sheets-Sheet 1

INVENTOR.
George H. Primeau
BY
W. C. Middleton
ATTORNEY

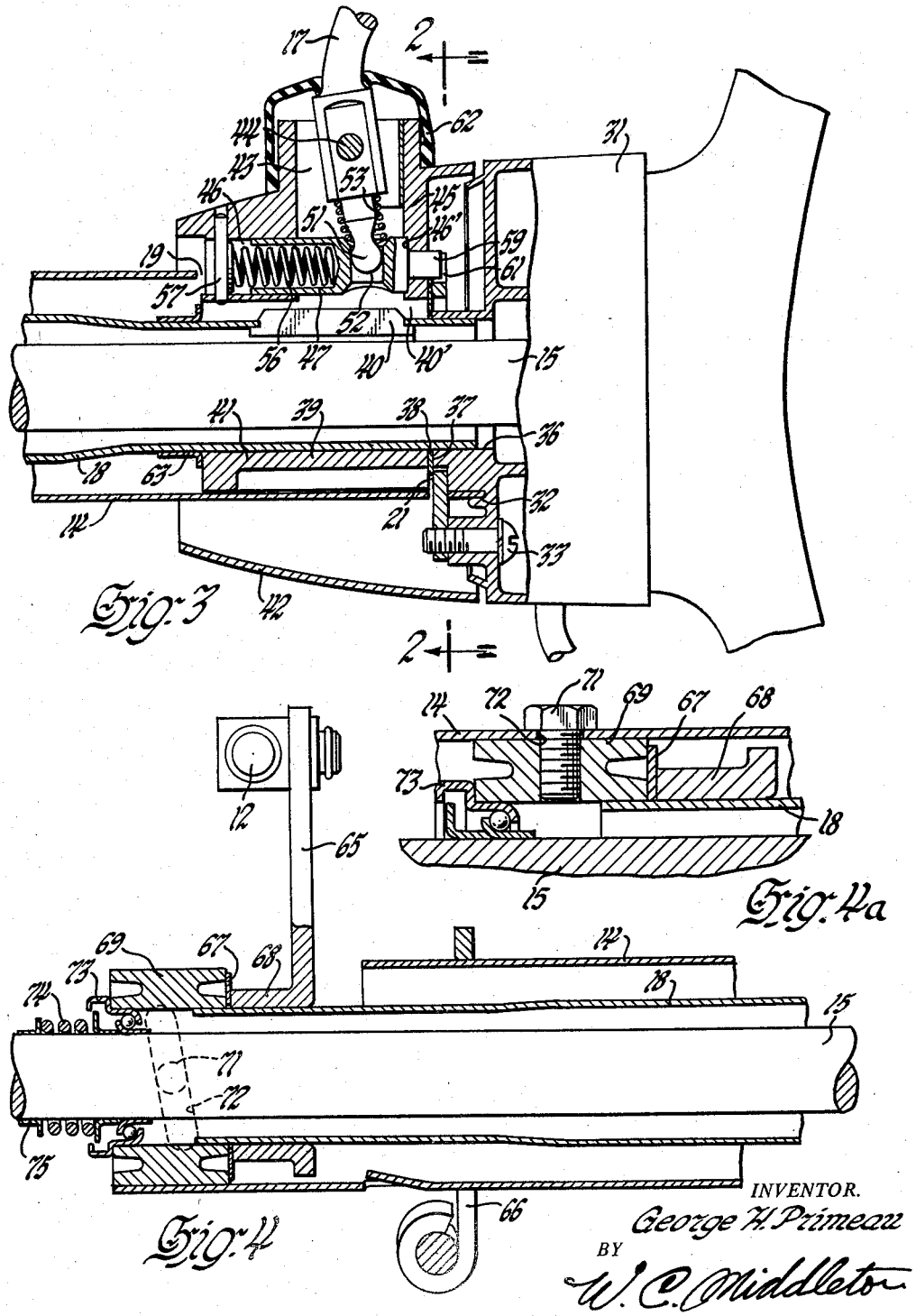

Feb. 16, 1960  G. H. PRIMEAU  2,924,988
TRANSMISSION CONTROL

Filed Sept. 23, 1957  4 Sheets-Sheet 3

INVENTOR.
George H. Primeau
BY
W. C. Middleton
ATTORNEY

Feb. 16, 1960
G. H. PRIMEAU
2,924,988
TRANSMISSION CONTROL
Filed Sept. 23, 1957
4 Sheets-Sheet 4
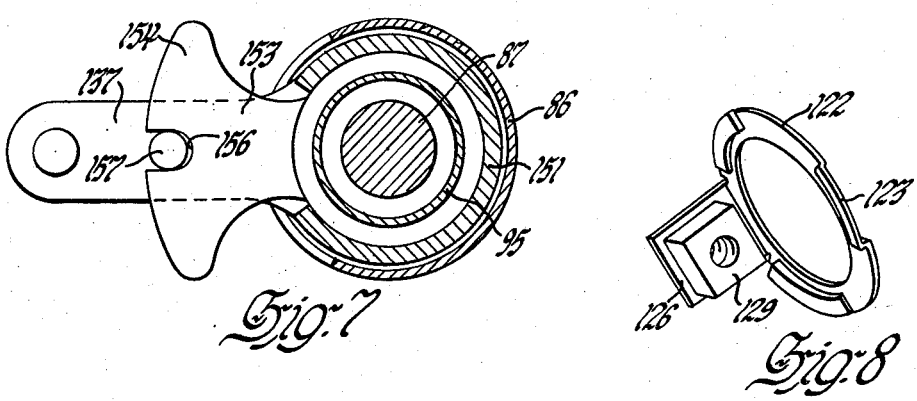
Fig. 7
Fig. 8
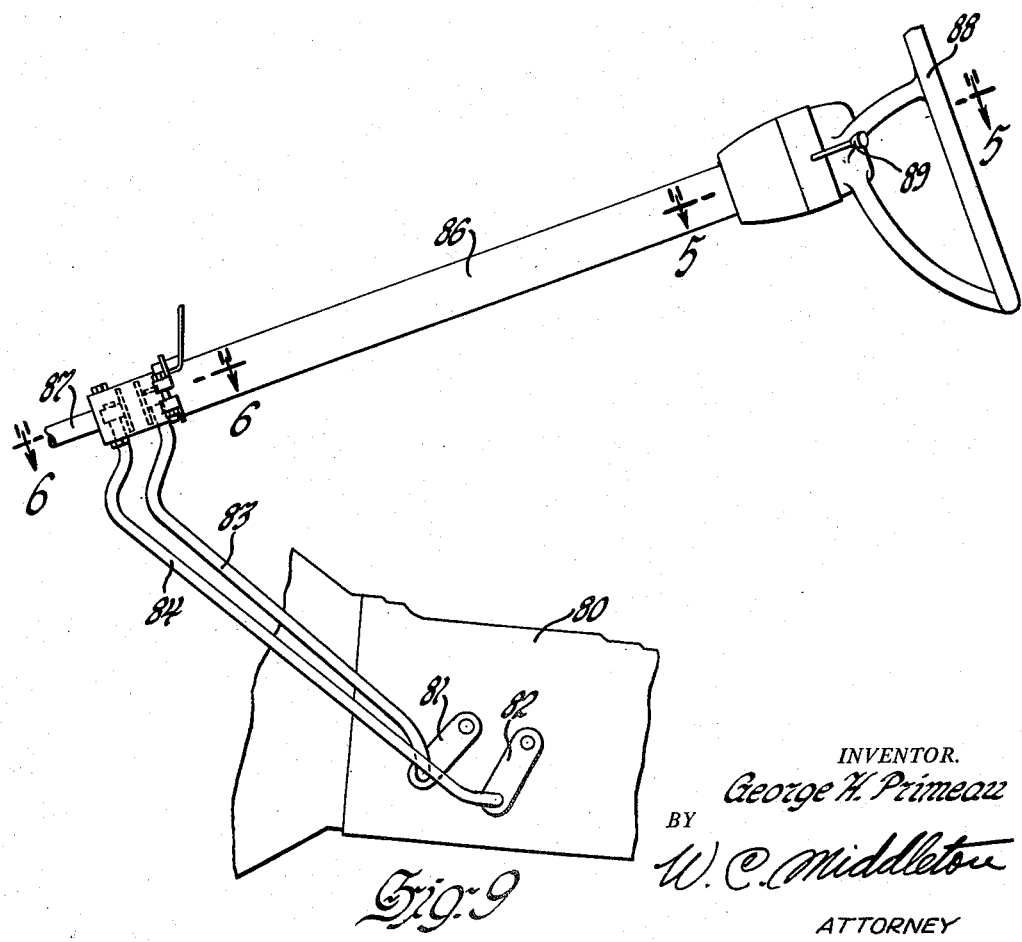
Fig. 9
INVENTOR.
George H. Primeau
BY
W. C. Middleton
ATTORNEY

United States Patent Office 2,924,988
Patented Feb. 16, 1960

2,924,988
TRANSMISSION CONTROL

George H. Primeau, Grosse Pointe Farms, Mich., assignor to General Motors Corporation, Detroit, Mich., a corporation of Delaware Application September 23, 1957, Serial No. 685,743

17 Claims. (Cl. 74—473)

This invention relates to transmission control linkages and more particularly an improved linkage mounted on the steering column of a vehicle.

The transmission control linkage has a hand lever located beneath the steering wheel which is connected by a control tube mounted concentrically within the steering column. In the modification designed for automatic transmissions of the type which employ a single multiple position control, the hand lever actuates a detent mechanism and rotates the housing and control tube assembly. This assembly is rotatably mounted in a bearing housing which is secured to the top of the steering column by a transversely insertable three-eared mounting plate. At the lower end of the steering column an adjustable thrust bearing axially locates the control tube and housing.

A modified control linkage for synchromesh transmissions of the type employing two dual position controls employs a hand lever connected by a rotary housing to reciprocate and rotate the control tube. An adjustable thrust bearing holds this assembly in position. At the lower end the control tube is clutched to either one of the shift levers which are supported by an adjustable thrust bearing.

An object of the invention is to provide in a control linkage mounted on a support column a bearing secured to the column by a transversely insertable three-eared mounting plate.

Another object of the invention is to provide in a control linkage, a hand lever operatively connected to control an axially movable detent member which cooperates with detent cams on the control lever bearing assembly.

Another object of the invention is to provide in a control linkage, a housing and a control tube mounted concentrically on a steering column between a fixed thrust bearing and an axially adjustable thrust bearing.

These and other objects of the invention will be more apparent from the following description and drawing of the preferred embodiments of the invention.

Fig. 3 is a partial section view on the line 3—3 of Fig. 1 showing details of the upper portion of the control linkage.

Fig. 4 is a partial section view on the line 4—4 of Fig. 1 showing the lower portion of the control linkage.

Fig. 4a is an enlarged partial section of the bushing 69 shown in Fig. 4 taken through a bolt 71.

Fig. 7 is a sectional view of Fig. 6 on the line 7—7.

Fig. 8 is a perspective view of an adjustable thrust bearing ring.

Fig. 9 is a view showing the modified control linkage.

Figure 1:
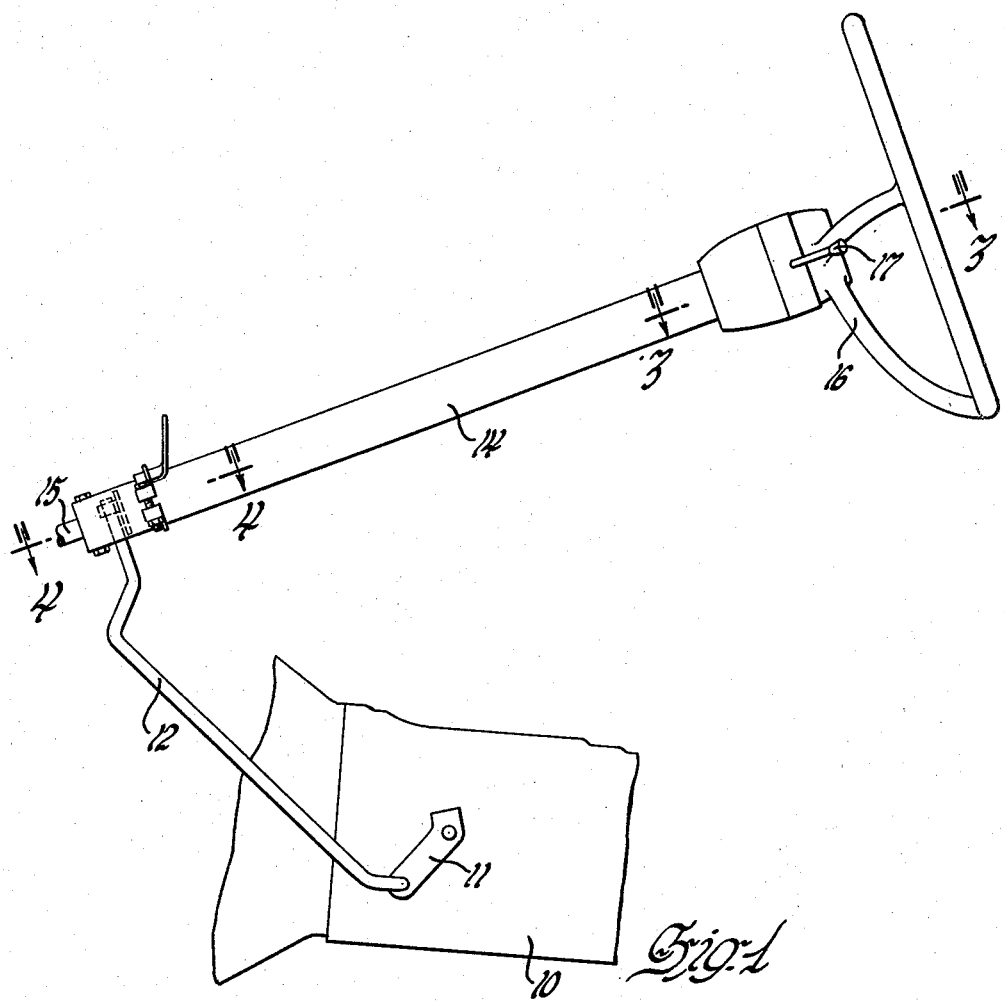
Fig. 1 is a view showing the general arrangement of a control linkage.

One modification of the transmission control linkage as shown in Fig. 1 may be employed to control an automatic transmission 10 having a single lever control 11 which is generally movable through four or five positions by the control rod 12 of the control linkage which is mounted on a mast jacket or steering column 14 which provides a support for the control linkage. The steering column is mounted in the automotive vehicle body and rotatably supports the steering shaft 15 located concentrically within the column and the steering wheel 16 connected to the steering shaft. The control linkage is actuated by a hand lever 17 located beneath the steering wheel 16 and actuates control rod 12.

Figure 2:
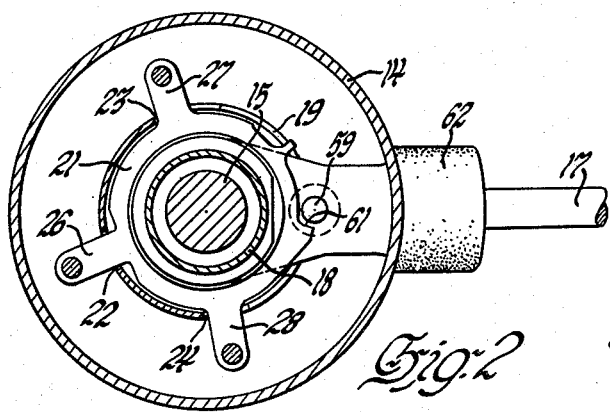
Fig. 2 is a section of Fig. 3 on the line 2—2.

The mechanism connecting the hand lever 17 to the control tube 18 located concentrically within the steering column 14 is best shown in Fig. 3. The upper end of the steering column 14 has an opening 19 at one side which extends approximately 180° around one side of the column to provide for the transverse insertion of the clamping or mounting plate 21 into the steering column. The steering column also has, as best shown in Fig. 2, a first aperture or slot 22 located substantially diametrically opposite the opening 19 and a second slot 23 and a third slot 24 located on opposite sides of the steering column and spaced apart slightly less than 180° measured around the side of steering column containing slot 22. It will be noted that the slots 23 and 24 are connected to the opening 19 so that the plate 21 may be laterally inserted into the column with the ears 26, 27 and 28, respectively, fitting into the first, second and third slots to retain the clamping plate 21 against axial movement with respect to the column. The bearing housing 31 has an annular recess 32 which fits over the end of the steering column 14 to laterally locate the housing on the column. A plurality of screws 33 extend through the housing 31 and are threaded into the ears of clamping plate 21 to secure the housing to the clamping plate and lock this bearing assembly on the end of the steering column 14. The housing 31 has a bearing surface 36 to rotatably support control tube 18 and a thrust bearing surface 37 engaging thrust washer 38 which provides the upper thrust bearing for the rotatable housing 39.

The rotatable housing 39 has an inner sleeve portion 41 fitting around the control tube 18 and an outer bowl portion 42 providing a fairing between the housing 31 and the steering column 14 which are interconnected by a radial portion 45. A key 40 fixed to the control tube 18 fits into a keyway 40' in the housing 39 so that the housing rotates the control tube. A radial aperture 43 in which the inner end of the hand lever 17 is pivoted by a pin 44 intersects a stepped bore 46 in which the stepped detent member 47 is reciprocally mounted. The bore 46 and detent 47 are stepped to provide engaging shoulders 46' which limit detent engaging movement of detent 46. The hand lever 17 has at its inner end a ball formation 51 fitting into a transverse hole 52 in detent member 47 to provide a pivotal connection between these members. The anti-rattle spring 53 is located between a shoulder on the hand lever 17 and detent member 47 to take up excessive clearances between these members and prevent rattling. A spring 56, retained in the bore 46 and by a pin and abutment 57 and fitting into a counterbore in the detent member 47, urges the detent member upward so that the cam end 59 engages a cam member 61 on the mounting plate 21. A flexible boot 62 fits about the hand lever 17 and a sleeve extension of the housing 39 surrounding the bore 33 to seal the opening 43. An abutment 63 is welded to the control tube 18 and engages the lower end of the sleeve portion 41 of the rotary housing 39.

At the lower end of the control linkage as best shown in Figs. 4 and 4a the steering column 14 is supported by a suitable bracket 66. The control lever 65 has an annular flange 68 welded to the control tube 18 which also provides a thrust bearing abutment. The flange 68 engages, through a thrust washer 67, the adjustable thrust bushing 69. The bushing 69 has a plurality of bolts 71 extending through inclined slots 72 located in the steering column 14 and threaded into the bushing. A bearing assembly 73 slidably fits between the bushing 69 and the steering shaft 15 and is biased in position by the spring 74 in which engages an abutment 75 fixed to the steering shaft 15. When the assembly is completed it will be seen that the clearances at the thrust washer 38, at the abutment 63 and at the thrust washer 67 may all be taken up in one adjusting operation by adjusting the position of the thrust bushing 69.

When it is desired to shift the transmission the hand lever 17 is rotated. Since the lever 17 is connected through the pivot 44 to the housing 39 and the housing 39 is conected by the key 40 and keyway 40' to the control tube 18, the lever 17 rotates the control tube 18. The control tube at the lower end is fixed to the lever 65 which actuates the control rod 12. The outer end of the hand lever 17 is normally urged to the lower position by the spring 56 at which time the detent 59 engages the cam 61 to prevent certain movements of the control linkage such as the shift to reverse or park positions. In order to shift into these positions it is necessary to lift the hand lever 17, depressing the detent 47 so that it will disengage the cam 61 to permit rotary movement of the housing 39 to these positions. Engaging movement of detent member 47 is limited by shoulders 46' and disengagaing movement by abutment 57.

Figure 5:
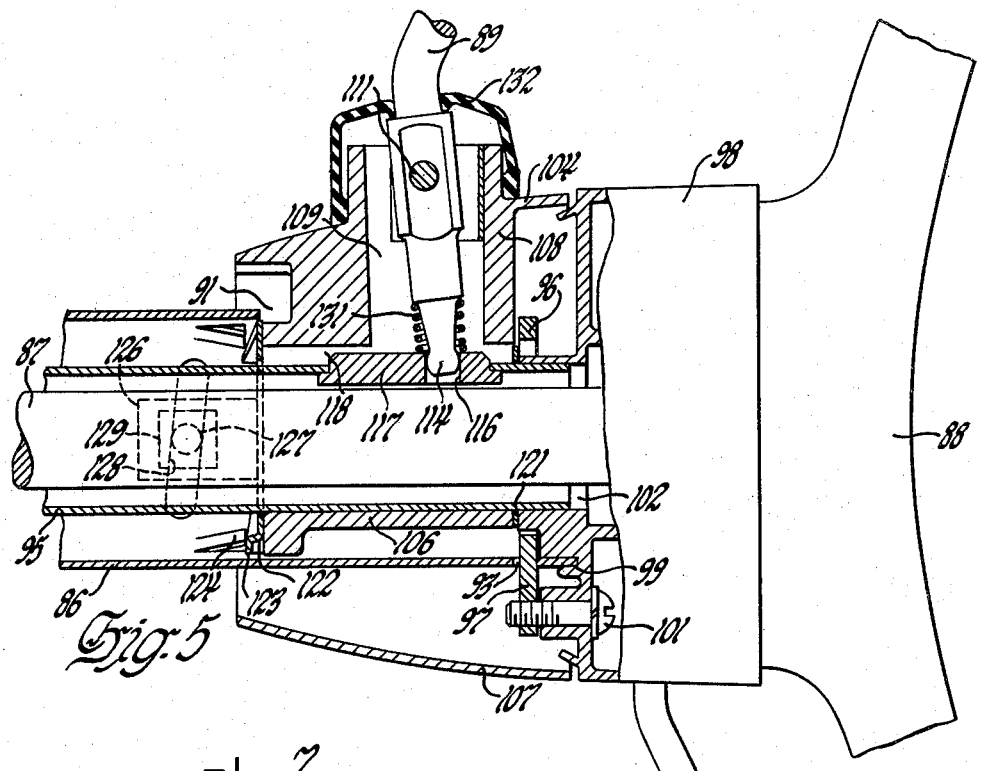
Fig. 5 is a partial sectional view on the line 5—5 of Fig. 9 showing the upper portion of the modification.
Figure 6:
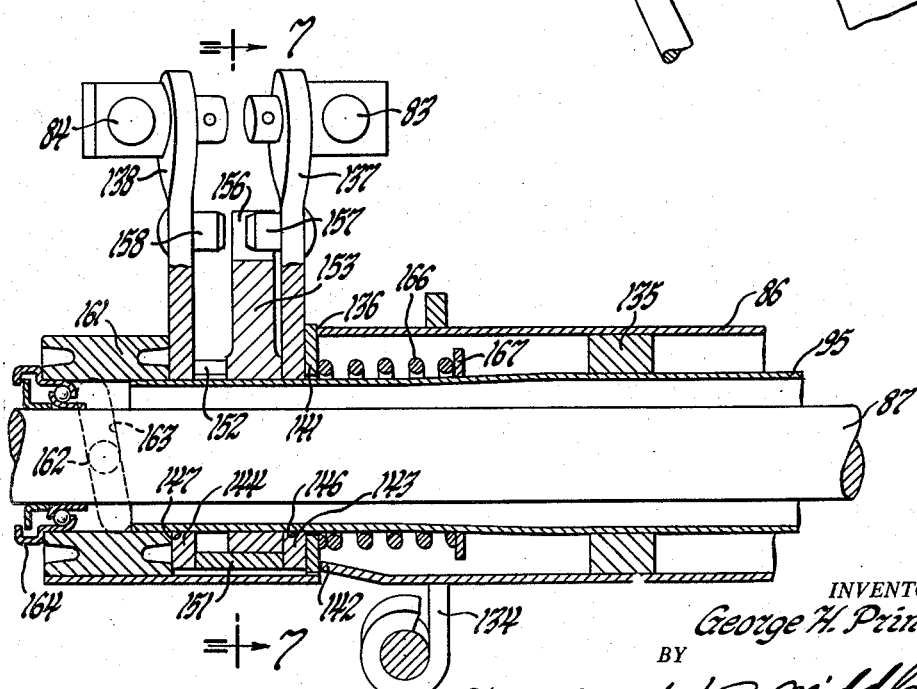
Fig. 6 is a sectional view on the line 6—6 of Fig. 9 showing the lower portion of the modification.

A second form of the invention employed to control a synchromesh transmission 80 having two control arms 81 and 82 which are respectively actuated by control rods 83 and 84 is illustrated in Fig. 9. The control linkage for controlling the rods 83 and 84 is located within a steering column 86 which provides a support for a steering shaft 87 controlled by the steering wheel 88. The hand lever 89 mounted beneath the steering wheel 88 controls the rods 83 and 84 by a control linkage mounted within the steering column 86 which is best shown in Figs. 5 and 6.

The steering column 86 has at its upper end an opening 91 extending approximately half way around the column and connected with second and third slots similar to the opening 19 and slots 23 and 24 shown in Fig. 2. The first slot 93 is located on the side opposite the opening between the second and third slots as shown in Fig. 5 and is in the same transverse plane as the second and third slots. The clamping or mounting plate 96 is generally circular in shape having an internal aperture to permit passage of the shift tube 95 and has a plurality of ears 97 one of which is illustrated extending through the slot 93. The bearing housing 98 which may also house the direction signal switch has an annular recess 99 which receives the end of the steering column 86 to hold the housing 98 against lateral movement with respect to the column. Screws 101 extend through the housing 98 and threadably engage each of the ears 97 to clamp the housing to the mounting plate and to secure this bearing assembly to the steering column. Housing 98 has a central bore 102 providing a bearing surface to rotatably mount the control tube 95 for both rotary and reciprocal movement.

The rotary housing 104 has an inner sleeve portion 106 slidably mounted on the control tube 95 and an outer fairing portion 107 providing a tapered surface between the housing 98 and the steering column 86. The sleeve portion 106 and fairing portion 107 of the housing 104 are connected by a radial portion 108 having a radial aperture 109 in which the hand lever 89 is pivoted for axial pivotal movement by a pin 111 fixed in the radial portion 108. The hand lever 89 has at its inner end a ball portion 114 fitting in an aperture 116 in key 117 fixed to the control tube 95 to provide a pivotal connection between the hand lever 89 and the control tube 95. The key 117 fits in an axial keyway 118 in the gear housing 104 so that the housing and the control tube 95 rotate together but may reciprocate axially relative to each other.

The housing 104 is axially located against upward movement by the thrust washer 121 located between an upper thrust bearing surface on the sleeve 106 and a similar thrust bearing surface on the housing 98. At the lower end of the sleeve 106 the thrust bearing surface is engaged by an adjustable thrust bearing ring 122 having a plurality of inclined cam surfaces 123 formed in the sheet metal ring 122 which engage a plurality of abutments 124 formed by pressing a cut out tongue of the sheet metal steering column 86 inwardly. The thrust bearing ring 122 has one or more tongues 126 extending axially from the ring and fitting within the steering column 86. A bolt 127 extending inwardly from the outside of the column 86 extends through an inclined slot 128 in column 86 and is threadably engaged with the nut 129 secured to the tongue 126. It will thus be seen that the bolt on the outside of the column 86 may rotate the tongue 126 and the bearing ring 122 to axially adjust the bearing ring to provide the proper clearance between the thrust bearing surfaces at the lower and upper ends of the sleeve 106. It will be appreciated that if the ring 122 has two tongues 126 cooperating with inclined slots that this will be sufficient to axially adjust the ring 122 and that the cam portions 123 and abutments 124 will not be necessary.

An anti-rattle spring 131 may be provided between a shoulder on the hand lever 89 and the key member 117 and a boot 132 may seal opening 109.

The lower end of this control linkage is best illustrated in Fig. 6 which shows the support bracket 134 for the steering column 86 and the bushing 135 preferably of fibrous material located between the steering column 86 and the control tube 95 to provide bearing support and to seal the space between these tubes. The steering column has at its lower end an opening 136 at one side permitting the insertion and assembly of the first reverse shift lever 137 and the second high shift lever 138. At the upper end of the opening 136 a thrust washer 141 is inserted in the column and has a portion bearing on one or more tongue type abutments 142 opposite the opening and the upper flat wall portion defining the opening 136 to locate the thrsut washer 141 in a transverse plane. The levers 137 and 138 have at their inner ends rounded portions 143 and 144 having apertures 146 and 147, respectively, to pivotally mount the levers on the control tube 95. The levers are spaced by a split ring 151 located between the ends 143 and 144 of the levers and extending substantially completely around the control tube but having spaced ends 152 to permit the fork member 153 which is secured to the control tube 95 to extend radially outward beyond the steering column 86. As best shown in Fig. 7, the fork 153 has a circumferentially extending blocking portion 154 which, as explained below, prevents a cross shift of the fork 153 from the first reverse or second high position except in the neutral position. The fork 153 has a slot 156 which may engage either pin 157 on the lever 137 or the pin 158 on the lever 138. The levers 137 and 138 are connected to the control rods 83 and 84, respectively.

The lever and fork assembly is retained in position by a thrust bushing 161 which engages the lower surface of the lever 138 and also provides a bearing for the lower end of the control tube 95. In order to adjust for variations in the size of the parts to provide a uniform clearance in all of these assemblies the bushing 161 is adjustably mounted on the steering column 86 by a bolt 162 which is inserted through an inclined slot 163 in the steering column and threaded into the bushing 161. The bushing 161 is rotated to a position providing the proper clearance for each lever and fork assembly and then the bolt 162 is tightened to lock the bushing 161 is position. A bearing 164 is provided between the bushing and the steering shaft 87 to rotatably support the steering shaft. This bearing may be retained in its position by the spring as shown in Fig. 4 by the spring 74. A coil spring 166 located between the thrust washer 141 and an abutment 167 secured to the control tube 95 resiliently urges a control tube 95 to the second third or upper position.

This transmission control mechanism is operated by the hand lever 89 located beneath the steering wheel 88. The hand lever is moved in the typical H pattern in which the handle end of the lever 89 is moved toward the steering wheel and rotated clockwise for high and counterclockwise for low or is cross shifted away from the steering wheel and moved clockwise for first or counterclockwise for reverse. The lever 89 is connected by the universal pivot 114—116 to the control tube 86 so that the cross shift movement or axial movement of the lever 89 reciprocates the control tube 95. The reciprocal movement in the control tube 95 moves the fork 153 in the space provided by the wider spacing ring 151 between the lower or first reverse position and the upper or second third position. In the second third position the slot 156 or the fork 153 engages the pin 157 so that rotary movement of the hand lever 89 which is transmitted through the housing 104 to the control tube 94—95 rotates the fork 153 and the lever 137. Similarly when the fork 153 is in the lower first reverse position rotary movement of the hand lever 89 will, through the fork 153, rotate the lever 138. When the control is in any ratio drive position the blocking portion 154 of fork 153 will prevent a cross shift. In third ratio, for example, the slot 156 in fork 153 is engaging pin 157 and rotated from the neutral position so that blocking portion 154 engages pin 158 to prevent a cross shift.

It will be appreciated that the control linkages are shown in a typical position but that they may be employed in any relative position with respect to the transmission. Thus, the terms "upper" and "lower" are merely used for convenience in connection with the device in the location illustrated and should merely be considered to define the relative position of the parts.

The above described modifications are illustrative of the invention, and it will be apparent to those skilled in the art that modifications may be made within the scope of the appended claims.

I claim:

1. In a control linkage, a support column, a rotary housing, bearing means rotatably supporting said housing with respect to said support column, said housing having a radial opening and an axial bore intersecting the inner end of said radial opening, a hand lever having an end located in said radial opening and mounted on said housing for pivotal movement in an axial plane, a detent member mounted in said axial bore for reciprocal movement, means interconnecting the inner end of said hand lever and said detent member so that the reciprocal pivotal movement of said hand lever reciprocates said detent member, said bearing means having detent cam means, and spring means mounted on said housing and engaging said detent member to normally urge said detent member into engagement with said cam means.

2. In a control linkage, a support column, a rotary housing, bearing means rotatably supporting said housing with respect to said support column, said housing having a radial bore and a stepped axial bore having a shoulder between the steps of different width and intersecting the inner end of said radial bore, a hand lever having an end located in said radial opening and mounted on said housing for pivotal movement in an axial plane, a detent member having a shoulder between portions of different width mounted in said axial bore for reciprocal movement with said shoulders engaging to limit movement in a detent engaging direction, means pivotally interconnecting the inner end of said hand lever and said detent member so that reciprocal pivotal movement of said hand lever reciprocates said detent member, said bearing means having detent stop means, a spring mounted in said bore and engaging said detent member to normally urge said detent member in a detent engaging direction, and spring abutment means in said bore to provide an abutment for said spring and to engage said detent member to limit movement in a disengaging direction.

3. In a control linkage, a support column, a control tube, bearing means rotatably and reciprocally mounting said control tube on said support column, a housing rotatably fixed and axially movable with respect to said control tube, a hand lever pivoted to said housing for axial pivotal movement and connected to said control tube to reciprocate said control tube, thrust bearing means on said support column engaging said housing to limit movement in one direction, means including a bushing having a thrust bearing surface engaging said housing to limit movement in the other direction and means on said bushing and said support column including an inclined cam surface on one engaging an abutment on the other so that relative rotary movement provides an axial adjustment, and means to rotate said bushing to axially adjust said bushing and to lock said bushing to said support column in all adjusted positions.

4. In a control linkage, a support column, a control tube, bearing means rotatably and reciprocally mounting said control tube on said support column, a housing rotatably fixed and axially movable with respect to said control tube, a hand lever pivoted to said housing for axial pivotal movement and connected to said control tube to reciprocate said control tube, thrust bearing means on said support column engaging said housing to limit movement in one direction, a bushing having a thrust bearing surface engaging said housing to limit movement in the other direction, inclined cam surfaces on said bushing, and support means on said support column, said inclined cam surfaces engaging said support means so that relative rotary movement provides an axial adjustment, and means to rotate said bushing to axially adjustably position said bushing and to lock said bushing to said support column in any adjusted position.

5. In a control linkage, a support column, a control tube, bearing means rotatably and reciprocally mounting said control tube on said support column, a housing rotatably fixed and axially movable with respect to said control tube, a hand lever pivoted to said housing for axial pivotal movement and connected to said control tube to reciprocate said control tube, thrust bearing means on said support column engaging said housing to limit upward movement, an abutment on said support column below said housing, a bushing having a thrust bearing surface engaging said housing and an inclined cam surface engaging said abutment, and means to rotate said bushing to axially adjustably position said bushing and to lock said bushing to said support column in a plurality of adjusted positions.

6. In a control linkage, a support column, a control tube mounted concentrically on said support column at the upper end, bearing means between said control tube and support column rotatably supporting said control tube and limiting upward axial movement, a hand lever, means connecting said hand lever to said control tube to rotate said control tube on rotation of said hand lever, a bearing abutment on said control tube, a bushing rotatably mounted on said support column located below said abutment, and securing means projecting through said slots and fixed to said bushing to axially move said bushing during rotary movement of said bushing and movable to secure said bsuhing to said support column, and means on said support column and said bushing including a slot inclined to a plane at right angles to the elements of said support column on one and an abutment on the other to axially adjust said bushing in response to rotary movement and means to rotate said bushing to axially adjust said bushing and to clamp said bushing to said support column in adjusted positions to prevent relative rotary movement.

7. In a control linkage, a support column having an elongated slot inclined to a plane at right angles to the elements of said support column, a control tube mounted concentrically on said support column, bearing means between said control tube and support column rotatably supporting said control tube and limiting upward axial movement, a hand lever, means connecting said hand lever to said control tube to rotate said control tube on rotation of said hand lever, a bearing abutment on said control tube, a bushing rotatably mounted on said support column located below said abutment, and securing means projecting through said slots and fixed to said bushing to axially move said bushing during rotary movement of said bushing and movable to secure said bushing to said support column.

8. In a control linkage, a support column having an opening in one side, a control tube located concentrically within said support column, means to rotate and reciprocate said control tube with respect to said support column, a pair of levers having an apertured end in said support column and rotatably mounted on said control tube, a fork fixed to said control tube between said levers for axial movement with said control tube between an upper and a lower position, spacing means wider than said fork to space said levers to permit axial movement of said fork, means on said fork and levers to connect said fork in said upper position to one lever and in said lower position to another lever, bearing means on said support column engaging the outer side of one lever, and the outer side of the other lever to axially locate said levers and spacing means.

9. In a control linkage, a support column having an opening in one side, a control tube located concentrically within said support column, means to rotate and reciprocate said control tube with respect to said support column, a pair of levers each having a rounded end rotatable in said support column and an aperture receiving said control tube, a fork fixed to said control tube between said levers for axial movement with said control tube between an upper and a lower position, a spacing ring wider than said fork extending around said fork and having ends substantially engaging opposite edges of said fork and having sides engaging said levers to space said levers, means on said fork and levers located radially beyond said support column to connect said fork in said upper position to one lever and in said lower position to another lever, bearing means on said support column engaging the outer side of one lever, and the outer side of the other lever to axially locate said levers and spacing ring.

10. In a control linkage, a support column having an opening in one side defined in part by a transverse edge and a transversely inclined elongated slot, a control tube located concentrically within said support column, means to rotate and reciprocate said control tube with respect to said support column, an abutment on the inside wall of said support column opposite said aperture, a bearing ring fitting into said support column and seating on said abutment and the transverse edge to limit movement in one direction, a pair of levers each having a rounded end rotatable in said support column and an aperture receiving said control tube, a fork fixed to said control tube and located between said levers for axial movement with said control tube between an upper and a lower position, a spacing ring wider than said fork extending around said fork and having ends substantially engaging opposite edges of said fork and having sides engaging said levers to space said levers, means on said fork and levers located radially beyond said support column to connect said fork in said upper position to one lever and in said lower position to the other lever, the outer side of one lever engaging said bearing ring, a bushing engaging the outer side of the other lever and having means extending into said slot to axially adjust said bushing responsive to rotary movement of said bushing and to lock said bushing in adjusting position.

11. In a control linkage, a mounting plate having a body and spaced ears, a tubular support column having three apertures and a connecting opening in a transverse plane, the first and second of said apertures each having an edge and being located on opposite sides of said support column, the third aperture defining a closed figure and being located on one side of said support column between said first and second apertures and said connecting opening being on the side opposite said third aperture and connecting to said first and second apertures to provide an entrance opening as wide as said plate body, said mounting plate shaped for transverse insertion of said mounting plate through said entrance opening into said support column with one of said ears entering said third aperture and the other ears sliding into said first and second apertures to engage said edge to axially locate said plate, a housing mounted on said column at one side of said plate, means on said housing and said column to limit movement toward said plate and securing means to clamp said housing and said plate together and to said support column.

12. In a control linkage, a mounting plate having a body and a plurality of spaced ears with one ear extending on a transverse axis and a pair of opposed laterally extending ears, a tubular support column having three apertures each having a transversely extending edge and a connecting opening in a transverse plane, the first and second of said apertures being located on opposite sides of said support column, the third aperture defining a closed figure and being located on one side of said support column between said first and second apertures and said connecting opening being on the side opposite said third aperture and connecting to said first and second apertures to provide an entrance opening as wide as said plate body, said mounting plate being shaped for transverse insertion of said mounting plate through said entrance opening into said support column with said one of said ears entering said third aperture and the other ears sliding into said first and second apertures, said ears engaging said edges to axially locate said plate, a housing having a recess fitting over the end of said support column to prevent transverse movement between said housing and said support column and securing means to clamp said housing and said plate together and thus secure said housing and said mounting plate to said support column.

13. In a control linkage, a mounting plate having a body and a plurality of spaced ears with one ear extending on a transverse axis and a pair of opposed laterally extending ears, a tubular support column having three apertures each having a transversely extending edge and a connecting opening in a transverse plane, the first and second of said apertures being located on opposite sides of said support column, the third aperture defining a closed figure and being located on one side of said support column between said first and second apertures and said connecting opening being on the side opposite said third aperture and connecting to said first and second apertures to provide an entrance opening as wide as said plate body, said mounting plate being shaped for transverse insertion of said mounting plate through said entrance opening into said support column with said one of said ears entering said third aperture and the other ears sliding into said first and second apertures to engage said edge to axially locate said plate, a bearing housing mounted on said column at one side of said plate, means on said bearing housing and said column to limit movement toward said plate, securing means to clamp said housing and said plate together and to said support column with said ears engaging said edges, a control tube rotatably mounted on said bearing housing, a rotary housing rotatably fixed on said control tube, a detent member mounted on said rotary housing for axial reciprocating movement, an operating lever pivoted to said rotary housing for axial pivotal movement and restrained against rotary pivotal movement whereby said operating lever rotates said rotary housing and control tube, cam stop means on said mounting plate, and means connecting said operating lever to said detent member to move said detent member into and out of engagement with said cam stop means.

14. In a control linkage, a mounting plate having a body and a plurality of spaced ears with one ear extending on a transverse axis and a pair of opposed laterally extending ears, a tubular support column having three apertures and a connecting opening in a transverse plane, the first and second of said apertures being located on opposite sides of said support column, the third aperture defining a closed figure and being located on one side of said support column between said first and second apertures and said connecting opening being on the side opposite said third aperture and connecting to said first and second apertures to provide an entrance opening as wide as said plate body, said mounting plate being shaped for transverse insertion of said mounting plate through said entrance opening into said support column with said one of said ears entering said third aperture and the other ears sliding into said first and second apertures to engage said edge to axially locate said plate, a bearing housing having rotary and thrust bearings mounted on said column at one side of said plate, means on said housing and said column to limit movement toward said plate, securing means to clamp said housing and said plate together and to said support column, a control tube rotatably and reciprocally mounted in said rotary bearing, a rotary housing rotatably and reciprocally mounted on said control tube and having one end engage said thrust bearing, and thrust bearing means mounted for axial adjustment on said support column engaging the other end of said rotary housing.

15. In a control linkage, a support column, a control tube, bearing means rotatably and reciprocally mounting said control tube on said support column, a housing rotatably fixed and axially movable with respect to said control tube, a hand lever pivoted to said housing for axial pivotal movement and connected to said control tube to reciprocate said control tube, thrust bearing means on said support column engaging said housing to limit movement in one direction, means including a bushing having a thrust bearing surface engaging said housing to limit movement in the other direction and means on said bushing and said support column including an inclined cam surface on one engaging an abutment on the other so that relative rotary movement provides an axial adjustment, means to rotate said bushing to axially adjust said bushing and to lock said bushing to said support column in all adjusted positions, a control lever operatively connected to said control tube, a second bushing having a thrust bearing surface engaging said control lever means on said second bushing and said support column including an inclined cam surface on one and an abutment on the other to provide axial adjustment of said second bushing responsive to rotary adjustment and means to lock said bushing in any adjusted position to adjustably position said control lever.

16. The invention defined in claim 15 and said control lever being secured to said control tube, and said second bushing adjustably positioning said control lever and tube.

17. The invention defined in claim 15 and said control lever being axially slidable on and rotatably fixed to said control tube, thrust bearing means axially positioned with respect to said support column holding said control lever against movement in one direction, and said second bushing holding said lever in an axially fixed position against said thrust bearing means.

References Cited in the file of this patent
UNITED STATES PATENTS

| 1,002,759 | Stine et al. | Apr. 9, 1912 |
| 2,489,735 | Zancan | Nov. 29, 1949 |
| 2,760,382 | Bliss | Aug. 28, 1956 |

UNITED STATES PATENT OFFICE

CERTIFICATE OF CORRECTION

Patent No. 2,924,988            February 16, 1960

George H. Primeau

It is hereby certified that error appears in the printed specification of the above numbered patent requiring correction and that the said Letters Patent should read as corrected below.

Column 2, line 60, after "bore 46" strike out "and"; column 3, line 31, for "disengagaing" read -- disengaging --; column 4, line 47, for "thrsut" read -- thrust --; column 5, line 1, for "is", second occurrence, read -- in --; column 8, line 5, for "adjusting" read -- adjusted --; column 10, line 38, list of References Cited, under UNITED STATES PATENTS, for the patent number "1,002,759" read -- 1,022,759 --.

Signed and sealed this 30th day of August 1960.

(SEAL)
Attest:

ERNEST W. SWIDER
Attesting Officer

ROBERT C. WATSON
Commissioner of Patents